(12) United States Patent
Yano

(10) Patent No.: US 11,731,517 B2
(45) Date of Patent: Aug. 22, 2023

(54) ELECTRIC VEHICLE

(71) Applicant: SUBARU CORPORATION, Tokyo (JP)

(72) Inventor: Takuya Yano, Tokyo (JP)

(73) Assignee: SUBARU CORPORATION, Tokyo (JP)

(*) Notice: Subject to any disclaimer, the term of this patent is extended or adjusted under 35 U.S.C. 154(b) by 349 days.

(21) Appl. No.: 17/060,465

(22) Filed: Oct. 1, 2020

(65) Prior Publication Data

US 2021/0101489 A1 Apr. 8, 2021

(30) Foreign Application Priority Data

Oct. 7, 2019 (JP) .................. 2019-184334

(51) Int. Cl.
*B60L 15/20* (2006.01)
*B60K 1/02* (2006.01)
(Continued)

(52) U.S. Cl.
CPC .......... *B60L 15/2072* (2013.01); *B60K 1/02* (2013.01); *B60L 15/2009* (2013.01); *B60W 10/08* (2013.01); *B60W 10/18* (2013.01); *G01B 21/22* (2013.01); *B60K 17/356* (2013.01); *B60L 50/60* (2019.02); *B60L 2240/12* (2013.01); *B60L 2240/14* (2013.01); *B60W 2510/08* (2013.01);
(Continued)

(58) Field of Classification Search
CPC .. B60L 15/2072; B60L 15/2009; B60L 50/60; B60L 2240/12; B60L 2240/14; B60K 1/02; B60K 17/356; B60W 10/08; B60W 10/18; B60W 2510/08; B60W 2520/06; B60W 2540/10; B60W 2540/12; G01B 21/22
USPC ........................................... 701/22
See application file for complete search history.

(56) References Cited

U.S. PATENT DOCUMENTS

2010/0029442 A1* 2/2010 Ito .................. B60W 10/06
477/183
2016/0129810 A1* 5/2016 Takahashi ............. B60L 7/18
903/903
(Continued)

FOREIGN PATENT DOCUMENTS

JP JP 2017-123759 A 7/2017

*Primary Examiner* — Mahmoud S Ismail
(74) *Attorney, Agent, or Firm* — McGinn I.P. Law Group, PLLC

(57) ABSTRACT

An electric vehicle includes first and second traveling motors, first and second rotational position sensors, and a measurement controller. The first rotational position sensor detects a rotation angle of the first traveling motor and has a first wheel-speed range in which a deviation of an original position of the first rotational position sensor is measurable. The second rotational position sensor detects a rotation angle of the second traveling motor and has a second wheel-speed range in which a deviation of an original position of the second rotational position sensor is measurable. The second wheel-speed range differs from the first wheel-speed range. The measurement controller executes, in an execution order, measurements of the deviations of the original positions of the first and second rotational position sensors while the electric vehicle is traveling, and switch the execution order on the basis of acceleration or deceleration data of the electric vehicle.

20 Claims, 4 Drawing Sheets

(51) Int. Cl.
  *B60W 10/08* (2006.01)
  *B60W 10/18* (2012.01)
  *G01B 21/22* (2006.01)
  B60K 17/356 (2006.01)
  B60L 50/60 (2019.01)
(52) U.S. Cl.
  CPC ..... *B60W 2520/06* (2013.01); *B60W 2540/10* (2013.01); *B60W 2540/12* (2013.01)

(56) References Cited

U.S. PATENT DOCUMENTS

| | | | | |
|---|---|---|---|---|
| 2016/0129901 | A1* | 5/2016 | Migita | B60K 6/52 903/910 |
| 2018/0375450 | A1* | 12/2018 | Schnell | H02P 6/181 |
| 2019/0135297 | A1* | 5/2019 | Takahashi | B60W 10/119 |
| 2020/0171962 | A1* | 6/2020 | Han | B60W 10/08 |
| 2020/0278378 | A1* | 9/2020 | Sawafuji | B60W 40/06 |

* cited by examiner

ELECTRIC VEHICLE

CROSS-REFERENCE TO RELATED APPLICATIONS

The present application claims priority from Japanese Patent Application No. 2019-184334 filed on Oct. 7, 2019, the entire contents of which are hereby incorporated by reference.

BACKGROUND

The technology relates to an electric vehicle including two traveling motors. A traveling motor is generally provided with a rotational position sensor that detects a rotation angle of a motor shaft of the traveling motor. In an electric vehicle, the torque of the traveling motor is controlled on the basis of an output of the rotational position sensor. A technique to calibrate an original position of the rotational position sensor has been proposed. For example, the calibration technique disclosed in Japanese Unexamined Patent Application Publication No. 2017-123759 involves learning an offset value of the rotational position sensor while an electric vehicle is traveling.

SUMMARY

An aspect of the technology provides an electric vehicle including a first traveling motor, a second traveling motor, a first rotational position sensor, a second rotational position sensor, and a measurement controller. The first traveling motor is configured to generate driving power to drive a first drive wheel. The second traveling motor is configured to generate driving power to drive a second drive wheel. The first rotational position sensor is configured to detect a rotation angle of the first traveling motor and has first wheel-speed range in which a deviation of an original position of the first rotational position sensor is measurable. The second rotational position sensor is configured to detect a rotation angle of the second traveling motor and has a second wheel-speed range in which a deviation of an original position of the second rotational position sensor is measurable. The second wheel-speed range is different from the first wheel-speed range. The measurement controller is configured to execute, in an execution order, measurement of the deviation of the original position of the first rotational position sensor and measurement of the deviation of the original position of the second rotational position sensor while the electric vehicle is traveling, and switch the execution order of the measurement of the deviation of the original position of the first rotational position sensor and the measurement of the deviation of the original position of the second rotational position sensor on the basis of traveling data on acceleration or deceleration of the electric vehicle.

An aspect of the technology provides an electric vehicle including a first traveling motor, a second traveling motor, a first rotational position sensor, a second rotational position sensor, and circuitry. The first traveling motor is configured to generate driving power to drive a first drive wheel. The second traveling motor is configured to generate driving power to drive a second drive wheel. The first rotational position sensor is configured to detect a rotation angle of the first traveling motor and has first wheel-speed range in which a deviation of an original position of the first rotational position sensor is measurable. The second rotational position sensor is configured to detect a rotation angle of the second traveling motor and has a second wheel-speed range in which a deviation of an original position of the second rotational position sensor is measurable. The second wheel-speed range is different from the first wheel-speed range. The circuitry is configured to execute, in an execution order, measurement of the deviation of the original position of the first rotational position sensor and measurement of the deviation of the original position of the second rotational position sensor while the electric vehicle is traveling, and switch the execution order of the measurement of the deviation of the original position of the first rotational position sensor and the measurement of the deviation of the original position of the second rotational position sensor on the basis of traveling data on acceleration or deceleration of the electric vehicle.

BRIEF DESCRIPTION OF THE DRAWINGS

The accompanying drawings are included to provide a further understanding of the technology and are incorporated in and constitute a part of this specification. The drawings illustrate example embodiments and, together with the specification, serve to explain the principles of the technology.

DETAILED DESCRIPTION

To learn the offset value of a rotational position sensor, i.e., to measure the deviation of an original position of a rotational position sensor, a traveling motor should be driven at a rotation speed appropriate for the measurement. In the case of an electric vehicle including two traveling motors, a vehicle speed appropriate for the measurement of the deviation of the original position generally differs between two rotational position sensors for the respective traveling motors owing to a difference in specifications between the two traveling motors or the two rotational position sensors, or a difference in speed reducing ratios from the traveling motors to the wheels.

It is desirable to provide an electric vehicle including two traveling motors and making it possible to measure deviations of original positions of two rotational position sensors of the respective traveling motors with high efficiency.

Figure 1:
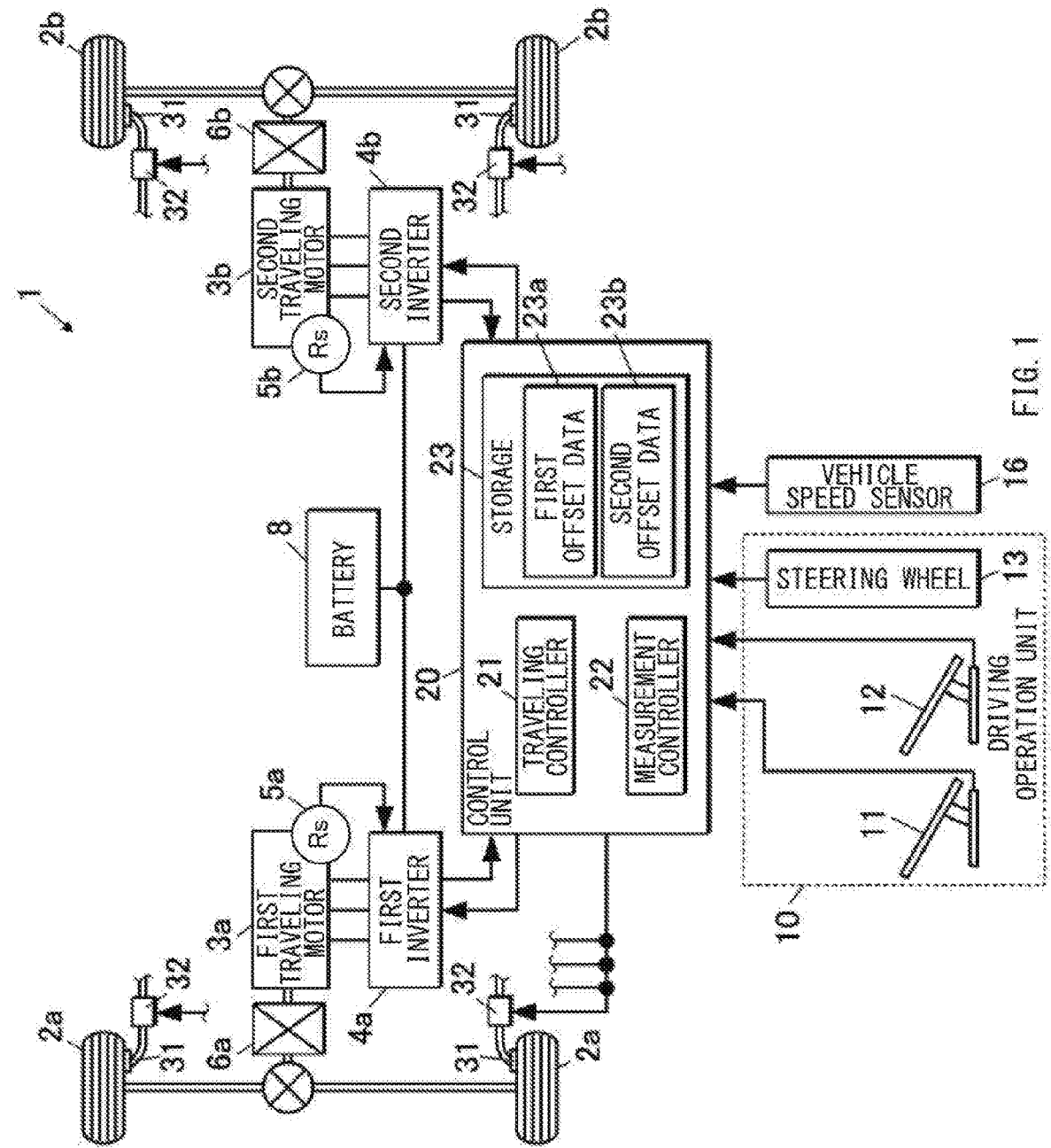
FIG. 1 is a block diagram of an example configuration of an electric vehicle according to one example embodiment of the technology.

Some example embodiments of the technology will now be described in detail with reference to the accompanying drawings. Note that the following description is directed to illustrative examples of the technology and not to be construed as limiting to the technology. Factors including, without limitation, numerical values, shapes, materials, components, positions of the components, and how the components are coupled to each other are illustrative only and not to be construed as limiting to the technology. Further, elements in the following example embodiments that are not recited in a most-generic independent claim of the technology are optional and may be provided on an as-needed basis. The drawings are schematic and are not intended to be drawn to scale. Throughout the present specification and the drawings, elements having substantially the same function and configuration are denoted with the same numerals to avoid any redundant description. FIG. 1 is a block diagram illustrating an example configuration of an electric vehicle 1 according to an example embodiment of the technology.

The electric vehicle 1 according to the example embodiment of the technology may include front wheels 2a, rear wheels 2b, a first traveling motor 3a, a first transmission 6a, a second traveling motor 3b, a second transmission 6b, a battery 8, a first inverter 4a, and a second inverter 4b. The first traveling motor 3a generates driving power to drive the front wheels 2a. The first transmission 6a may transmit the driving power from the first traveling motor 3a to the front wheels 2a. The second traveling motor 3b generates driving power to drive the rear wheels 2b. The second transmission 6b may transmit the driving power from the second traveling motor 3b to the rear wheels 2b. The battery 8 may supply electric power to the first traveling motor 3a and the second traveling motor 3b. The first inverter 4a and the second inverter 4b may respectively drive the first traveling motor 3a and the second traveling motor 3b using the electric power received from the battery 8. The first transmission 6a may have a speed reducing ratio greater than that of the second transmission 6b. The speed reducing ratios of the first transmission 6a and the second transmission 6b may be different from each other, and may be variable in several stages. In one embodiment, the front wheels 2a may serve as a "first drive wheel". In one embodiment, the rear wheels 2b may serve as a "second drive wheel".

The first traveling motor 3a is provided with a first rotational position sensor 5a that detects a rotation angle of a motor shaft of the first traveling motor 3a. The second traveling motor 3b is provided with a second rotational position sensor 5b that detects a rotation angle of a motor shaft of the second traveling motor 3b. For example, the first rotational position sensor 5a and the second rotational position sensor 5b may be resolvers that output analog signals indicating the rotation angles of the respective motor shafts.

The first traveling motor 3a may be a three-phase alternate current (AC) motor, for example. For instance, the first inverter 4a may receive or output a three-phase current synchronized with the rotation of the motor shaft through vector control, which brings the first traveling motor 3a into a power running state, a coasting state, or a regenerative state. The first inverter 4a provided between the battery 8 and the first traveling motor 3a may convert electric power and transmit the converted power.

The second traveling motor 3b may have the same configuration as the first traveling motor 3a, and the second inverter 4b may have the same configuration as the first inverter 4a. Alternatively, the second traveling motor 3b may differ in various rated specifications from the first traveling motor 3a, and the second inverter 4b may differ in various rated specifications from the first inverter 4a.

The electric vehicle 1 may further include a brake mechanism, a driving operation unit 10, and a vehicle speed sensor 16. The brake mechanism may include a brake unit 31 and a hydraulic pressure controller 32, and may cause one or both of the front wheels 2a and the rear wheels 2b to generate braking torque. The brake unit 31 may be a brake caliper, for example. The hydraulic pressure controller 32 may electrically control the hydraulic pressure to drive the brake unit 31. The driving operation unit 10 may include an accelerator pedal 11, a brake pedal 12, and a steering wheel 13. The driving operation unit 10 may receive driver's operational commands. The vehicle speed sensor 16 may detect a vehicle speed. For example, the vehicle speed sensor 16 may include a plurality of wheel-speed sensors detecting respective speeds of the front wheels 2a and the rear wheels 2b. The vehicle speed sensor 16 may detect an average speed of the detected wheel speeds as the vehicle speed.

The electric vehicle 1 may further include a control unit 20 that executes various control. The control unit 20 may include a traveling controller 21, a measurement controller 22, and a storage 23. The traveling controller 21 may control the first inverter 4a, the second inverter 4b, and the brake mechanism including the brake unit 31 and the hydraulic pressure controller 32 on the basis of signals received from the driving operation unit 10. The measurement controller 22 executes measurement of the deviation of the original position of the first rotational position sensor 5a and measurement of the deviation of the original position of the second rotational position sensor 5b. The storage 23 may store control data and control programs. The storage 23 may include a data storage section 23a and a data storage section 23b. The data storage section 23a may store first offset data on the deviation of the original position of the first rotational position sensor 5a. The data storage section 23b may store second offset data on the deviation of the original position of the second rotational position sensor 5b.

For example, the control unit 20 may include a single electronic control unit (ECU). Alternatively, the control unit 20 may include a plurality of ECUs operating in cooperation with each other while communicating with each other. When a control program is executed by the central processing unit (CPU) in the ECU, the control unit 20, the traveling controller 21, or the measurement controller 22 may execute a corresponding control process.

[Traveling Control]

The traveling controller 21 may control the travel of the electric vehicle 1 in two modes including a normal mode and a pedal-releasing brake mode. In the normal mode, the electric vehicle 1 may be accelerated basically by depressing the accelerator pedal 11, and decelerated basically by depressing the brake pedal 12. In the pedal-releasing brake mode, the electric vehicle 1 may be accelerated basically by depressing the accelerator pedal 11, and decelerated basically by releasing the accelerator pedal 11. In other words, in the pedal-releasing bake mode, the traveling controller 21 may accelerate the electric vehicle 1 on the basis of an operation of the accelerator pedal 11 in a depressing direction, and perform of braking of the electric vehicle 1 on the basis of an operation of the accelerator pedal 11 in a releasing direction. In one embodiment, the depressing direction may serve as a "forward direction". In one embodiment, the releasing direction may serve as a "backward direction". The normal mode or the pedal-releasing brake mode may be selected by a user's operation or setting.

Upon the accelerating operation of the electric vehicle 1, the traveling controller 21 may determine driving torque for all of the wheels (all of the front wheels 2a and the rear wheels 2b) of the electric vehicle 1 on the basis of the amount of the operation. The traveling controller 21 may then drive the first inverter 4a and the second inverter 4b so that the first traveling motor 3a and the second traveling motor 3b are brought into a power running state, in order to produce torque comparable to the determined driving torque. The first inverter 4a, the first traveling motor 3a, the second inverter 4b, and the second traveling motor 3b may be subjected to vector control to produce driving torque comparable to the required driving torque. In the vector control, the traveling controller 21 may add the value of the first offset data stored in the data storage section 23a to an output of the first rotational position sensor 5a in order to acquire the rotational position of the motor shaft of the first traveling motor 3a. The traveling controller 21 may control a power device in the first inverter 4a on the basis of the acquired rotational position. Similarly, the traveling controller 21 may add the value of the second offset data stored in the data storage section 23b to an output of the second rotational position sensor 5b in order to acquire the rotational position of the motor shaft of the second traveling motor 3b. The traveling controller 21 may control a power device in the second inverter inverter 4b on the basis of the acquired rotational position.

Upon the decelerating operation of the electric vehicle 1, the traveling controller 21 may determine braking torque for all of the wheels (all of the front wheels 2a and the rear wheels 2b) of the electric vehicle 1 on the basis of the operation of the brake pedal 12. The traveling controller 21 may then drive the first inverter 4a and the second inverter 4b so that the first traveling motor 3a and the second traveling motor 3b are brought into a regeneration running state, in order to produce torque comparable to the determined braking torque. The control for driving the first traveling motor 3a and the second traveling motor 3b in the regeneration running state may be performed in the same way as the control for driving the first traveling motor 3a and the second traveling motor 3b in the power running state except that the direction of the torque is inverted. In a case where sufficient braking torque comparable to the determined torque is not produced only through the regenerative running, the traveling controller 21 may cover the shortage of the braking torque by controlling the hydraulic pressure controller 32 of the brake mechanism.

When controlling the production of the driving torque or braking torque, the traveling controller 21 may distribute the driving or braking torque among the front wheels 2a and the rear wheels 2b in consideration of the vehicle's balance and other factors. The traveling controller 21 may define the driving or braking torque distributed to the front wheels 2a as the required torque for the front wheels 2a, and the driving or braking torque distributed to the rear wheels 2b as the required torque for the rear wheels 2b. The traveling controller 21 may then cause the first traveling motor 3a, the second traveling motor 3b, and the brake mechanism including the brake unit 31 and the hydraulic pressure controller 32 to produce the respective required torque.

Figure 2:
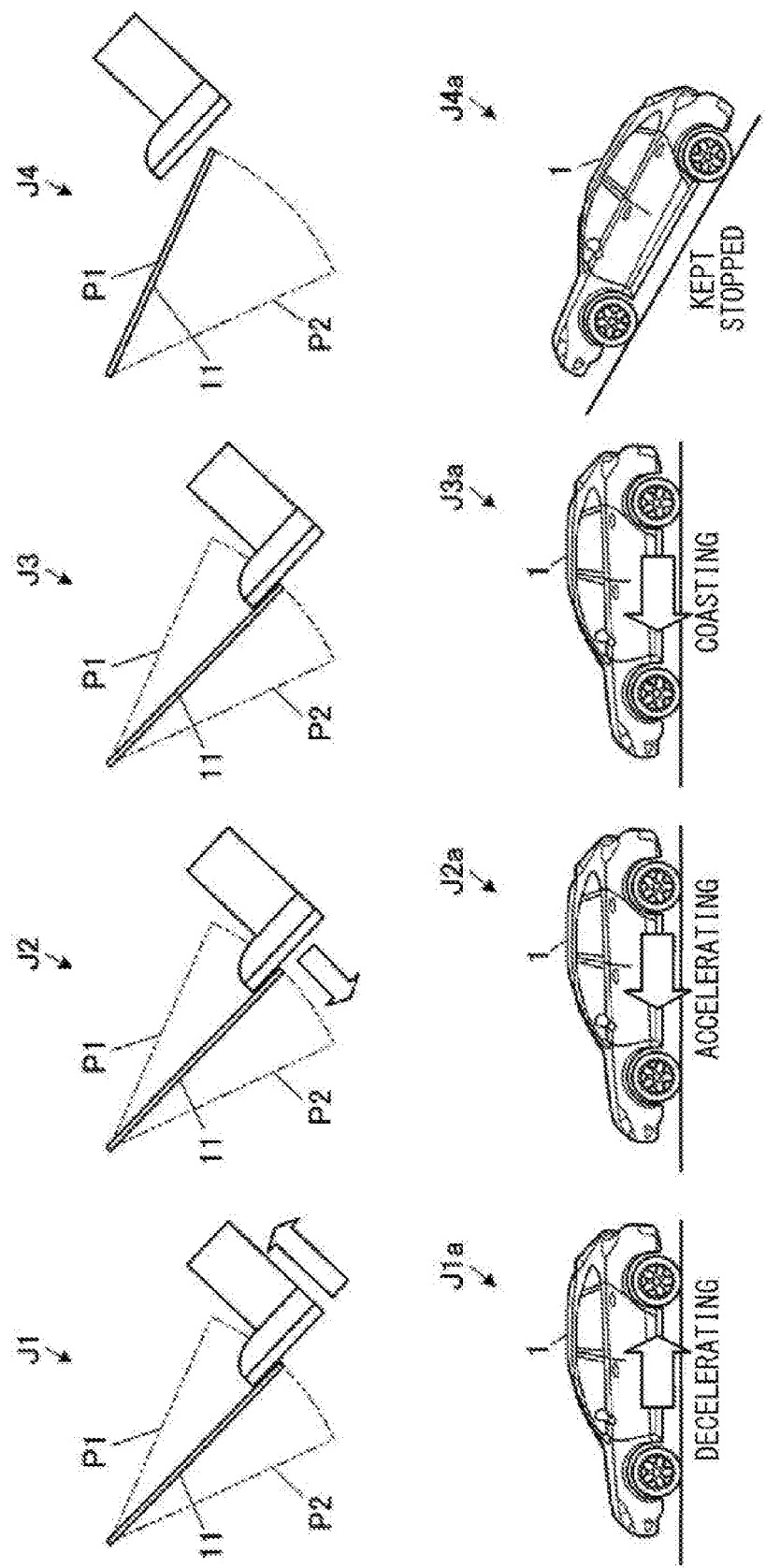
FIG. 2 is a diagram illustrating an example relation between a pedal operation in a pedal-releasing brake mode and a state of the electric vehicle.

FIG. 2 illustrates an example relation between a pedal operation in the pedal-releasing brake mode and a state of the electric vehicle 1. In FIG. 2, the accelerator pedal 11 may be located at a top dead center P1 when being released, and a bottom dead center P2 when being fully depressed.

In the pedal-releasing braking mode, depressing the accelerator pedal 11 may accelerate the electric vehicle 1 (refer to J2 and J2a in FIG. 2), and returning the accelerator pedal 11 may decelerate the electric vehicle 1 (refer to J1 and J1a in FIG. 2), as described above. Depressing the accelerator pedal 11 to a middle position between the top dead center P1 and the bottom dead center P2 and holding the accelerator pedal 11 at the middle position may coast the electric vehicle 1 (refer to J3 and J3a in FIG. 2). Releasing the accelerator pedal 11 may keep the electric vehicle 1 stopped (refer to J4 and J4a in FIG. 2).

In the normal mode, releasing the accelerator pedal 11 being depressed may coast the electric vehicle 1 at a constant vehicle speed. In the pedal-releasing brake mode, in contrast, it is necessary to depress the accelerator pedal 11 to the middle position and hold the accelerator pedal 11 at the middle position to coast the electric vehicle 1 at a constant vehicle speed, which impairs the ease of driving operation. Accordingly, the electric vehicle 1 is less likely to coast at a constant speed in the pedal-releasing brake mode and more likely to travel with being slightly accelerated or decelerated than in the normal mode.

[Process of Measuring Original-Position Deviations of Rotational Position Sensors]

In response to a diagnosis request, for example, the measurement controller 22 executes, in an execution order, measurement of the deviation of the original position of the first rotational position sensor 5a and measurement of the deviation of the original position of the second rotational position sensor 5b while the electric vehicle 1 is traveling. The diagnosis request may be issued periodically or under any condition. The frequency and the condition of issuing the diagnosis request should not be limited to a particular frequency or condition.

A common method of measuring the deviation of the original position of the rotational position sensor will now be described. The measurement of the deviation of the original position is performed while the motor shaft is rotating without generating torque. For the measurement, the traveling motor is subjected to vector control based on an output of the rotational position sensor. In the vector control, a d-axis current and a q-axis current are set to zero. The traveling motor generates no torque because the q-axis current is set to zero. In this case, a d-axis voltage is zero if no deviation of the original position of the rotational position sensor is detected. In contrast, the d-axis voltage is not zero if any deviation of the original position of the rotational position sensor is detected. In a case where the d-axis voltage is not zero, an offset gradually varied is added to the output of the rotational position sensor. On the basis of the offset output of the rotational position sensor, the vector control and the measurement of the d-axis voltage described above are performed to acquire an offset value at which the d-axis voltage becomes zero. The offset value acquired through the measurement method is defined as the deviation of the original position.

The measurement of the deviation of the original position involves such an acquiring process in which the vector control is repeated while the offset value is varied. The measurement of the deviation of the original position thus cannot be completed immediately and can require a finite measurement period of time. Additionally, in the measurement, the required torque for the traveling motor is limited to zero because the q-axis current of the traveling motor is set to zero.

The measurement of the deviation of the original position involves determining a rotation speed of the traveling motor appropriate for the measurement. First, whether the d-axis voltage is zero or not is determined in the measurement of the deviation of the original position. Accordingly, it is preferable that the d-axis voltage should represent a large value when not being zero. Because the d-axis voltage is an induced electromotive force, the d-axis voltage represents a larger value as the rotation speed increases. Thus, a lower limit of the rotation speed of the traveling motor is defined so that the d-axis voltage is detectable even if the deviation of the original position to be detected is minimum. Meanwhile, too high rotation speed can raise other concerns such as hindering pulse width modulation (PWM) control and thus preventing efficient motor control. Thus, an upper limit of the rotation speed of the traveling motor is defined within a range not causing such concerns. The range of the rotation speed of the traveling motor appropriate for the measurement is thus determined between the lower limit and the upper limit. The range of the rotation speed of the traveling motor is converted into a range of the wheel speed on the basis of the speed reducing ratio of the transmissions and the diameters of the wheels.

In the electric vehicle 1 according to the example embodiment, a wheel-speed range W1 (hereinafter referred to as a first wheel-speed range W1) appropriate for the measurement of the deviation of the original position of the first rotational position sensor 5a may be higher than a wheel-speed range W2 (hereinafter referred to as a second wheel-speed range W2) appropriate for the measurement of the deviation of the original position of the second rotational position sensor 5b, as illustrated in FIG. 4. The first wheel-speed range W1 and the second wheel-speed range W2 may partly overlap one another.

[Process of Measuring Original-Position Deviations]

Figure 3:
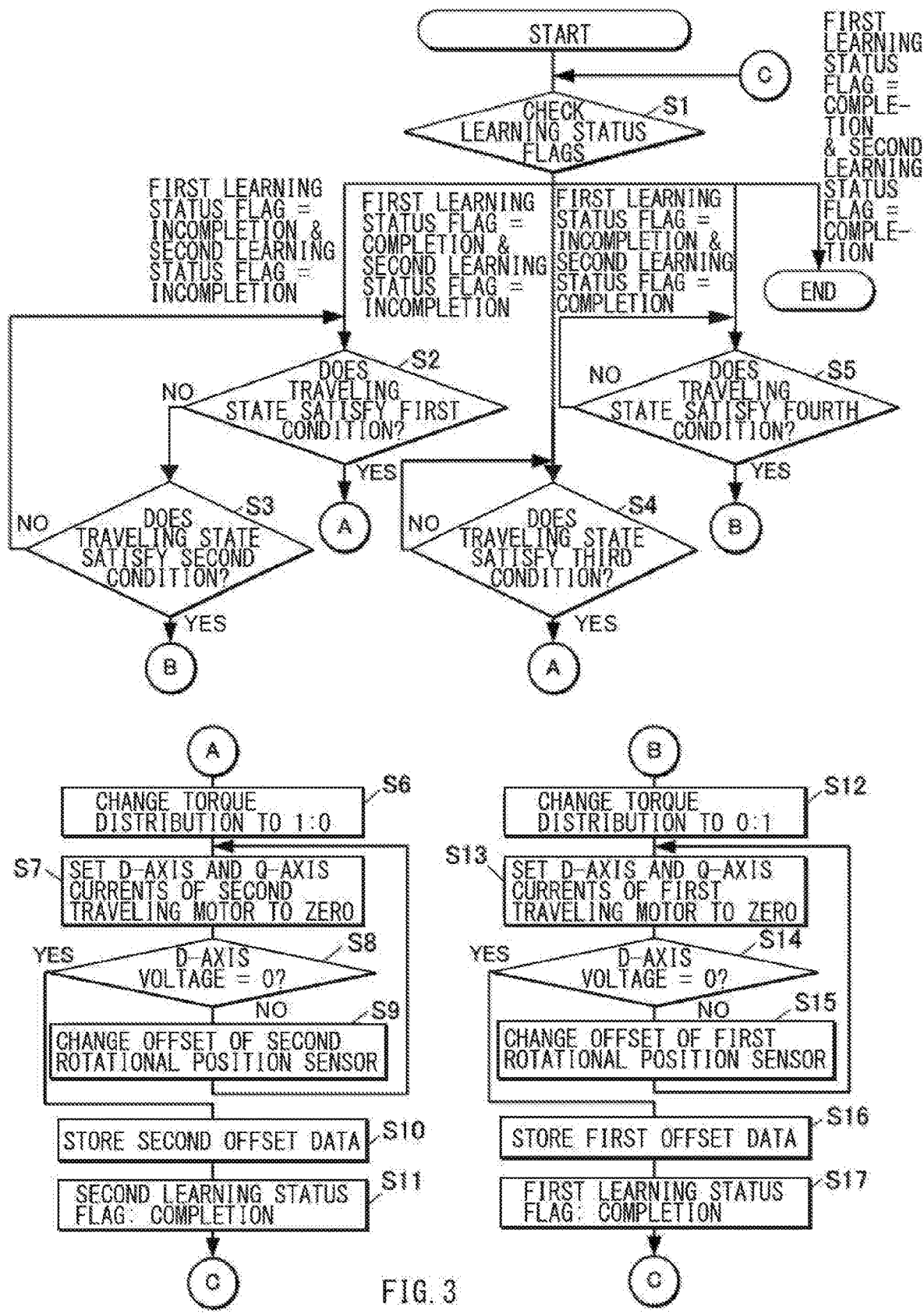
FIG. 3 is a flowchart of a process of measuring original-position deviations executed by a measurement controller.

The process of measuring original-position deviations executed by the measurement controller 22 will now be described with reference to a flowchart. In the measuring process, the measurement controller 22 executes, in an execution order, the measurement of the deviation of the original position of the first rotational position sensor 5a and the measurement of the deviation of the original position of the second rotational position sensor 5b. The process of measuring original-position deviations may start in response to a diagnosis request issued while the pedal-releasing brake mode, i.e., the traveling mode in which the electric vehicle 1 is more likely to travel with being slightly accelerated or decelerated is selected. FIG. 3 is a flowchart of the process of measuring original-position deviations the executed by the measurement controller 22. FIGS. 4A to 4D illustrate traveling states of the electric vehicle 1 under respective first to fourth conditions determined in Steps S2 to S5 of the flowchart in FIG. 3.

Upon the start of the process of measuring original-position deviations in response to the diagnosis request, the measurement controller 22 may check, in Step S1, a learning status flag of the first rotational position sensor 5a (hereinafter referred to as a first learning status flag) and a learning status flag of the second rotational position sensor 5b (hereinafter referred to as a second learning status flag). The first learning status flag may indicate the completion or incompletion of the measurement of the deviation of the original position of the first rotational position sensor 5a. The second learning status flag may indicate the completion or incompletion of the measurement of the deviation of the original position of the second rotational position sensor 5b. The first learning status flag and the second learning status flag may be stored in the storage 23. Upon the issue of the diagnosis request, the first learning status flag indicating the incompletion and the second learning status flag indicating the incompletion may be set as initial values of the first learning status flag and the second learning status flag.

If the first learning status flag and the second learning status flag are both determined as indicating the incompletion in Step S1, the measurement controller 22 may proceed the procedure to determination processes of Steps S2 and S3. If the first learning status flag is determined as indicating the completion and the second learning status flag as indicating the incompletion in Step S1, the measurement controller 22 may proceed the procedure to a determination process of Step S4. If the first learning status flag is determined as indicating the incompletion and the second learning status flag as indicating the completion in Step S1, the measurement controller 22 may proceed the procedure to a determination process of Step S5. If the first learning status flag and the second learning status flag are both determined as indicating the completion in Step S1, the measurement controller 22 may end the procedure of measuring original-position deviations.

In Step S2, the measurement controller 22 may determine whether the traveling state of the electric vehicle 1 satisfies the first condition. In Step S3, the measurement controller 22 may determine whether the traveling state of the electric vehicle 1 satisfies the second condition. If the traveling state of the electric vehicle 1 does not satisfy the first condition (Step S2: NO) and if the traveling state of the electric vehicle 1 does not satisfy the second condition (Step S3: NO), the measurement controller 22 may repeat the determination processes of Steps S2 and S3.

Figure 4A:
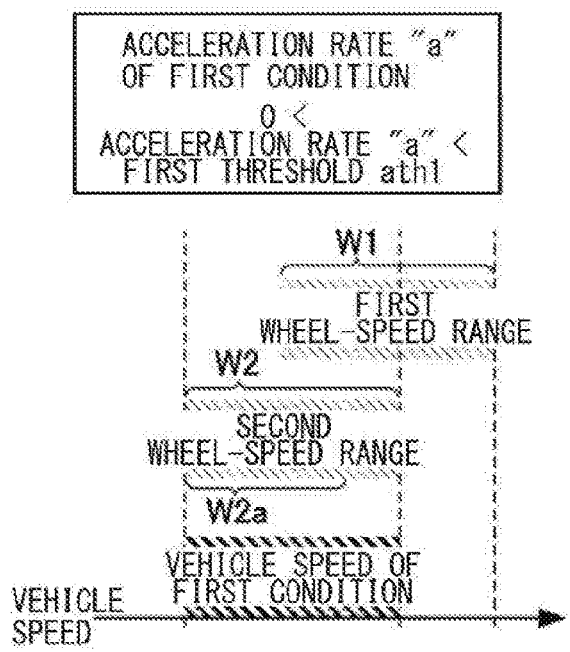
FIG. 4A is a diagram illustrating an example traveling state of the electric vehicle under a first condition determined in Step S2 of the flowchart in FIG. 3.

As illustrated in FIG. 4A, the first condition may be a condition that the vehicle speed is within the second wheel-speed range W2, and that an acceleration rate "a" of the electric vehicle 1 is greater than zero and less than a first threshold ath1. Under the first condition, the vehicle speed of the electric vehicle 1 may be moderately increased and gradually shifted from the second wheel-speed range W2 to the first wheel-speed range W1 due to the acceleration rate "a". The first threshold ath1 of the acceleration rate "a" may exclude a large acceleration rate at the start of traveling, for example, and a large acceleration rate that hinders the deviation of the original position from being properly measured. The first threshold ath1 may be set to a value allowing for detection of a low acceleration rate "a" generated when the electric vehicle 1 is traveling in a substantially coasting manner in the pedal-releasing brake mode.

Figure 4B:
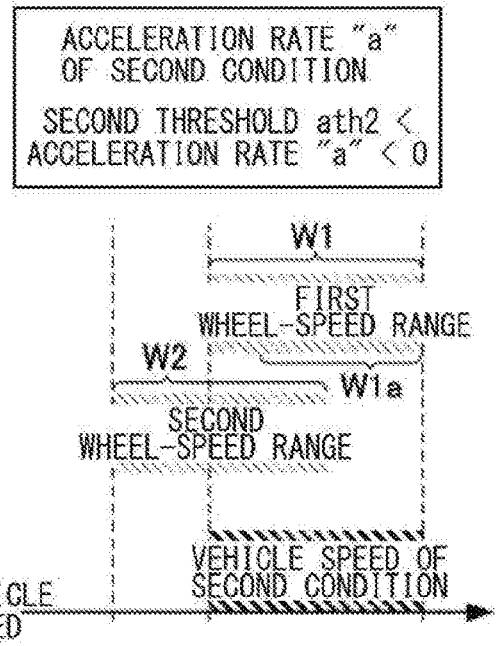
FIG. 4B is a diagram illustrating an example traveling state of the electric vehicle under a second condition determined in Step S3 of the flowchart in FIG. 3.

As illustrated in FIG. 4B, the second condition may be a condition that the vehicle speed is within the first wheel-speed range W1, and that the acceleration rate "a" of the electric vehicle 1 is less than zero (i.e., the electric vehicle 1 is decelerated) and greater than a second threshold ath2 that is a negative value. Under the second condition, the vehicle speed the electric vehicle 1 may be moderately decreased and gradually shifted from the first wheel-speed range W1 to the second wheel-speed range W2 due to the negative acceleration rate "a". The second threshold ath2 of the acceleration rate "a" may exclude a large deceleration rate at a stop of traveling, for example, and a large deceleration rate that hinders the deviation of the original position from being properly measured. The second threshold ath2 may be set to a value allowing for detection of a low negative acceleration rate "a" (deceleration) generated when the electric vehicle 1 is traveling in a substantially coasting manner in the pedal-releasing brake mode.

If the traveling state of the electric vehicle 1 is determined as satisfying the first condition in Step S2 (Step S2: YES), the measurement controller 22 may request the traveling controller 21 to change the torque distribution between the front wheel 2a and the rear wheel 2b to 1:0 (Step S6). After the torque of the second traveling motor 3b is set to zero, the measurement controller 22 may start the process of acquiring the deviation of the original position of the second rotational position sensor 5b (Steps S7, S8, and S9). As described above, in the acquiring process, the measurement controller 22 may set the d-axis current and the q-axis current of the second traveling motor 3b to zero (Step S7), determine whether the d-axis voltage becomes zero (Step S8), and if the d-axis voltage is not zero (Step S8: NO), change the offset to be added to the output of the second rotational position sensor 5b (Step S9). The measurement controller 22 may then repeat the acquiring process including Steps S7 to S9 until the d-axis voltage is determined as being zero (Step S8: YES).

If the d-axis voltage becomes zero in the acquiring process (Step S8: YES), the measurement controller 22 may cause the procedure to exit the acquiring process including Steps S7 to S9. The measurement controller 22 may define the offset at the time as the deviation of the original position, and store the deviation of the original position as the second offset data in the data storage section 23b (Step S10). Thereafter, the measurement controller 22 may set the second learning status flag to a value indicating the completion (Step S11), and return the procedure to Step S1.

Because the traveling state of the electric vehicle 1 satisfies the first condition in the acquiring process including Steps S7 to S9, the vehicle speed may be within the second wheel-speed range W2 and moderately increased. Accordingly, the acquiring process including Steps S7 to S9 is likely to be completed normally while the electric vehicle 1 is traveling at such a vehicle speed moderately increasing and before the vehicle speed deviates from the second wheel-speed range W2.

If the vehicle speed of the electric vehicle 1 deviates from the second wheel-speed range W2 during the acquiring process including Steps S7 to S9, the measurement controller 22 may end the acquiring process and return the procedure to Step S2. Alternatively, the vehicle speed of the first condition may be adjusted within a low-side range W2a of the second wheel-speed range W2 in consideration of the time required for the acquiring process including Steps S7 to S9 and the acceleration rate "a" of the electric vehicle 1, to prevent the vehicle speed from exceeding the second wheel-speed range W2 before the completion of the acquiring process.

If the traveling state of the electric vehicle 1 is determined as satisfying the second condition in Step S3 (Step S3: YES), the measurement controller 22 may request the traveling controller 21 to change the torque distribution between the front wheel 2a and the rear wheel 2b to 0:1 (Step S12). After the torque of the first traveling motor 3a is set to zero, the measurement controller 22 may start the process of acquiring the deviation the original position of the first rotational position sensor 5a (Steps S13, S14, and S15). As described above, in the acquiring process, the measurement controller 22 may set the d-axis current and the q-axis current of the first traveling motor 3a to zero (Step S13), determine whether the d-axis voltage becomes zero (Step S14), and if the d-axis current is not zero (Step S14: NO), change the offset to be added to the output of the first rotational position sensor 5a (Step S15). The measurement controller 22 may then repeat the acquiring process including Steps S13 to S15 until the d-axis voltage is determined as being zero (Step S14: YES).

If the d-axis voltage becomes zero in the acquiring process (Step S14: YES), the measurement controller 22 may cause the procedure to exit the acquiring process including Steps S13 to S15. The measurement controller 22 may define the offset at the time as the deviation of the original position, and store the deviation of the original position as the first offset data in the data storage section 23a (Step S16). Thereafter, the measurement controller 22 may set the first learning status flag to a value indicating the completion (Step S17), and return the procedure to Step S1.

Because the traveling state of the electric vehicle 1 satisfies the second condition in the acquiring process including Steps S13 to S15, the vehicle speed may be within the first wheel-speed range W1 and moderately decreased. Accordingly, the acquiring process including Steps S13 to S15 is likely to be completed normally while the electric vehicle 1 is traveling at such a vehicle speed moderately decreasing and before the vehicle speed deviates from the first wheel-speed range W1.

If the vehicle speed of the electric vehicle 1 deviates from the first wheel-speed range W1 during the acquiring process including Steps S13 to S15, the measurement controller 22 may end the acquiring process and return the procedure to Step S2. Alternatively, the vehicle speed of the second condition may be adjusted within a high-side range W1a of the first wheel-speed range W1 in consideration of the time required for the acquiring process including Steps S13 to S15 and the acceleration rate of the electric vehicle 1, to prevent the vehicle speed from deviating from the first wheel-speed range W1.

Figure 4C:
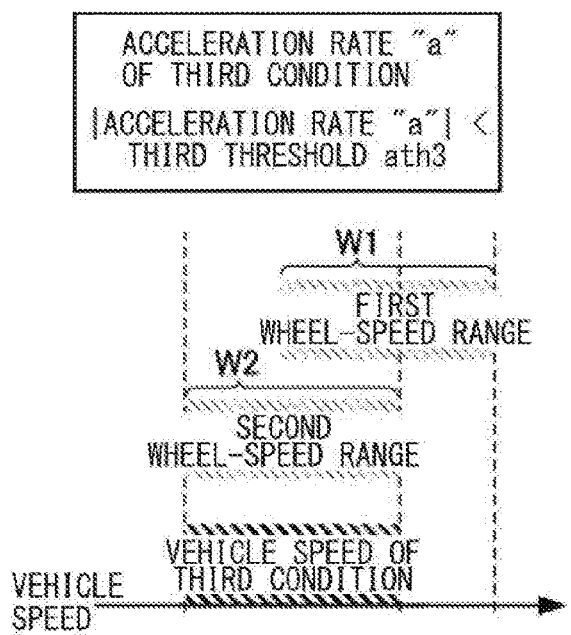
FIG. 4C is a diagram illustrating an example traveling state of the electric vehicle under a third condition determined in Step S4 of the flowchart in FIG. 3.

If the first learning status flag is determined as indicating the completion and the second learning status flag as indicating the incompletion in Step S1, the measurement controller 22 may determine whether the traveling state of the electric vehicle 1 satisfies the third condition (Step S4). If the traveling state of the electric vehicle 1 does not satisfy the third condition (Step S4: NO), the measurement controller 22 may repeat the determination process including Step S4 until the traveling state of the electric vehicle 1 satisfies the third condition. As illustrated in FIG. 4C, the third condition may be a condition that the vehicle speed is within the second wheel-speed range W2, and that an absolute value of the acceleration or deceleration rate "a" is less than a third threshold ath3. The third threshold ath3 may exclude a large acceleration rate and a large deceleration rate. The third threshold ath3 may be set to a value allowing for detection of a low acceleration or deceleration rate "a" generated when the electric vehicle 1 is traveling in a substantially coasting manner in the pedal-releasing brake mode.

As described above, if the traveling state of the electric vehicle 1 satisfies the second condition (Step S3: YES), the vehicle speed may be moderately decreased. Accordingly, the electric vehicle 1 may be gradually shifted to the traveling state satisfying the third condition while traveling at such a vehicle speed moderately decreasing. That is, if the traveling state of the electric vehicle 1 satisfies the second condition (Step S3: YES), the electric vehicle 1 may be subjected to the processes including Steps S12 to S17 and then to the determination process including Step S4 while traveling at such a vehicle speed moderately decreasing. The traveling state of the electric vehicle 1 may thus be quickly determined as satisfying the third condition at Step S4 (Step S4: YES).

If the traveling state of the electric vehicle is determined as satisfying the third condition in Step S4 (Step S4: YES), the measurement controller 22 may proceed the procedure to Step S6. The measurement controller 22 may then execute the processes including Steps S6 to S11 described above to complete the measurement of the deviation of the original position of the second rotational position sensor 5b. The process of measuring original-position deviations may be thereby completed.

Figure 4D:
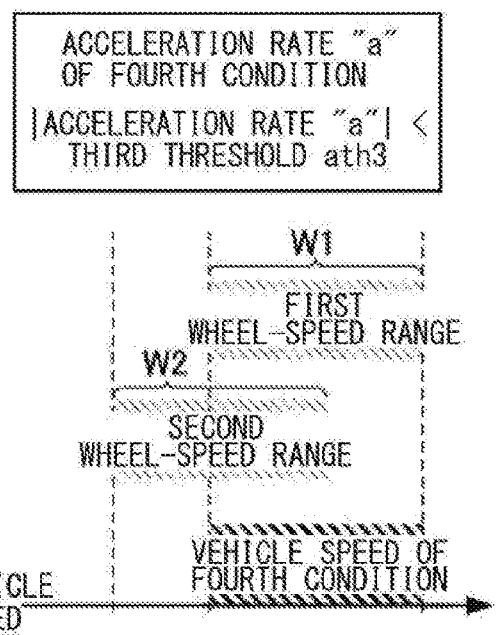
FIG. 4D is a diagram illustrating an example traveling state of the electric vehicle under a fourth condition determined in Step S5 of the flowchart in FIG. 3.

If the first learning status flag is determined as indicating the incompletion and the second learning status flag as indicating the completion in Step S1, the measurement controller 22 may determine whether the traveling state of the electric vehicle 1 satisfies the fourth condition (Step S5). If the traveling state of the electric vehicle 1 does not satisfy the fourth condition (Step S5: NO), the measurement controller 22 may repeat the determination process including Step S5 until the traveling state of the electric vehicle 1 satisfies the fourth condition. As illustrated in FIG. 4D, the fourth condition may be a condition that the vehicle speed is within the first wheel-speed range W1, and that the absolute value of the acceleration or deceleration rate "a" is less than the third threshold ath3.

As described above, if the traveling state of the electric vehicle 1 satisfies the first condition (Step S4: YES), the vehicle speed may be moderately increased. Accordingly, the electric vehicle 1 may be gradually shifted to the traveling state satisfying the fourth condition while traveling at such a vehicle speed moderately increasing. That is, if the traveling state of the electric vehicle 1 satisfies the first condition (Step S2: YES), the electric vehicle 1 may be subjected to the process including Step S6 to S11 and then to the determination process including Step S5 while traveling at such a vehicle speed moderately increasing. The traveling state of the electric vehicle 1 may thus be quickly determined as satisfying the fourth condition at Step S5 (Step S5: YES).

If the traveling state of the electric vehicle is determined as satisfying the fourth condition in Step S5 (Step S5: YES), the measurement controller 22 may proceed the procedure to Step S12. The measurement controller 22 may then execute the processes including Steps S12 to S17 described above to complete the measurement of the deviation of the original position of the first rotational position sensor 5a. The process of measuring original-position deviations may be thereby completed.

Through the process of measuring original-position deviations described above, it is possible to measure the deviations of the original positions of the first rotational position sensor 5a and the second rotational position sensor 5b with high effectivity while the driver is traveling the electric vehicle 1 in a substantially coasting manner (moderately accelerating or decelerating the electric vehicle 1) in the pedal-releasing brake mode.

In the electric vehicle 1 according to at least one example embodiment described above, the measurement controller 22 executes the measurements of the deviations of the original positions of the first rotational position sensor 5a and the second rotational position sensor 5b in an execution order. The measurement controller 22 switches the execution order of the measurements of the deviations of the original positions of the first rotational position sensor 5a and the second rotational position sensor 5b on the basis of the data on acceleration or deceleration of the electric vehicle 1. In other words, the measurement controller 22 determines which of the first rotational position sensor 5a and the second rotational position sensor 5b should be measured first on the basis of the data on acceleration or deceleration of the electric vehicle 1, and switches to the measurement of the rotational position sensor to be performed first. Further, the first wheel-speed range W1 appropriate for the measurement of the first rotational position sensor 5a and the second wheel-speed range W2 appropriate for the measurement of the second rotational position sensor 5b are set so as not to be identical to each other. Accordingly, accelerating the electric vehicle 1 may shift the vehicle speed from the second wheel-speed range W2 to the first wheel-speed range W1, and decelerating the electric vehicle 1 may shift the vehicle speed from the first wheel-speed range W1 to the second wheel-speed range W2. It is thus possible to execute the measurements of the first rotational position sensor 5a and the second rotational position sensor 5b in an execution order depending on the shift of the vehicle speed and in the respective wheel-speed ranges appropriate for the first rotational position sensor 5a and the second rotational position sensor 5b. This improves the efficiency of the measurement.

For example, in an example case illustrated in FIG. 4B where the second wheel-speed range W2 is lower than the first wheel-speed range W1 and where the vehicle speed is within the first wheel-speed range W1 and decreasing, the measurement controller 22 may execute the measurement of the first rotational position sensor 5a first. In contrast, in an example case illustrated in FIG. 4A where the vehicle speed is within the second wheel-speed range W2 and increasing, the measurement controller 22 may execute the measurement of the second rotational position sensor 5b first. Such switching of the execution order of the measurements allows the measurements of the first rotational position sensor 5a and the second rotational position sensor 5b to be quickly completed while the electric vehicle 1 is traveling at such a vehicle speed moderately decreasing or increasing.

Further, in the electric vehicle 1 according to some example embodiments in which the measurement controller 22 executes the measurements of the deviations of the original positions of the first rotational position sensor 5a and the second rotational position sensor 5b an execution order, the measurement controller 22 may change the torque ratio between the front wheel 2a and the rear wheel 2b to 1:0 or 0:1. The measurement controller 22 may then execute the measurement of the first rotational position sensor 5a or the second rotational position sensor 5b whose torque is set to zero. Thereafter, the measurement controller 22 may invert the torque ratio and execute the measurement of the first rotational position sensor 5a or the second rotational position sensor 5b whose torque is set to zero. This suppresses the hindrance to the generation of torque in accordance with a driver's driving operation during the measurements of the first rotational position sensor 5a and the second rotational position sensor 5b.

Further, according to the electric vehicle 1 of some example embodiments, the process of measuring original-position deviations illustrated in FIG. 3, in which the measurement of the first rotational position sensor 5a and the measurement of the second rotational position sensor 5b are executed in an execution order, may be performed while the pedal-releasing brake mode is selected. In the pedal-releasing brake mode, the electric vehicle 1 is likely to be moderately accelerated or moderately decelerated. Accordingly, it is possible to measure the deviations of original positions of the first rotational position sensor 5a and the second rotational position sensor 5b by taking an advantage of such traveling states.

Some of the example embodiments of the technology have been described above; however, the example embodiments of the technology should not be limited to the foregoing example embodiments. For example, in the foregoing example embodiments, the process of measuring original-position deviations illustrated in FIG. 3 is performed while the pedal-releasing brake mode is selected; however, in another example embodiment, the measurement process may be performed while the normal mode is selected. In still another example embodiment, the electric vehicle 1 may be operable only in the pedal-releasing brake mode or only in the normal mode. Further, the process of measuring original-position deviations described in the foregoing example embodiments involves setting the q-axis current and d-axis current to zero in the vector control of the three-phase AC motor, and determining whether the d-axis voltage is zero; however, the method of measuring original-position deviations should not be limited thereto. Another method that involves determining a rotation speed range appropriate for the measurement may be applied to the example embodiments of the technology. Moreover, in the foregoing example embodiments, the speed reducing ratio may differ between the transmissions; however, in another example embodiment, the gear ratio may differ between transmissions instead. The other details described in the foregoing embodiments may be modified as appropriate without departing from the gist of the technology.

According to at least one example embodiment of the technology, in a case where an electric vehicle includes two traveling motors and two rotational position sensors, a wheel-speed range appropriate for the measurement of the deviation of the original position of one of the rotational position sensors is set so as not to be completely identical to a wheel-speed range appropriate for the measurement of the deviation of the original position of the other rotational position sensor. According to at least one example embodiment of the technology in which the measurements of the deviations of the original positions of the two rotational position sensors are executed in an execution order, the measurement controller switches the execution order of the measurements, i.e., determines which of the two rotational position sensors should be measured first, on the basis of the data on acceleration or deceleration. Such switching often allows the vehicle speed to shift from the wheel-speed range appropriate for the rotational position sensor to be measured first to the wheel-speed range appropriate for the rotational position sensor to be measured next while the electric vehicle is driven by a normal driving operation. While the vehicle speed is shifting in such a manner, the measurement of one of the rotational position sensors and the measurement of the other rotational position sensor are executed in the execution order in respective appropriate wheel-speed ranges. This eliminates the need for additional control of the vehicle speed to measure the original-position deviations. Accordingly, it is possible to achieve these measurements with higher efficiency.

It should be appreciated that the foregoing example embodiments of the technology described merely illustrative and non-limiting and are not intended to limit the scope of the technology. It should be also appreciated that various omissions, replacements, and modifications may be made in the foregoing example embodiments described herein, without departing from the scope of the technology. The technology is intended to include such modifications and alterations in so far as they fall within the scope of the appended claims or the equivalents thereof.

The measurement controller 22 illustrated in FIG. 1 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the measurement controller 22. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and an NVRAM. The ASIC is an integrated circuit (IC) customized to perform, and the FPGA is an integrated circuit designed to be configured after manufacturing in order to perform, all or a part of the functions of the measurement controller 22 illustrated in FIG. 1.

The invention claimed is:

1. An electric vehicle comprising:
   a first traveling motor configured to generate driving power to drive a first drive wheel;
   a second traveling motor configured to generate driving power to drive a second drive wheel;
   a first rotational position sensor configured to detect a rotation angle of the first traveling motor, the first rotational position sensor having a first wheel-speed range in which a deviation of an original position of the first rotational position sensor is measurable;
   a second rotational position sensor configured to detect a rotation angle of the second traveling motor, the second rotational position sensor having a second wheel-speed range in which a deviation of an original position of the second rotational position sensor is measurable, the second wheel-speed range being different from the first wheel-speed range; and
   a measurement controller configured to
      execute, in an execution order of sequence, measurement of the deviation of the original position of the first rotational position sensor and measurement of the deviation of the original position of the second rotational position sensor while the electric vehicle is traveling, and
      switch the execution order of sequence between the measurement of the deviation of the original position of the first rotational position sensor and the measurement of the deviation of the original position of the second rotational position sensor on a basis of traveling data on acceleration or deceleration of the electric vehicle.

2. The electric vehicle according to claim 1, wherein
the second wheel-speed range is lower than the first wheel-speed range, and
in a case where a vehicle speed of the electric vehicle is within the first wheel-speed range and decreasing, the measurement controller switches the execution order to execute the measurement of the deviation of the original position of the first rotational position sensor and the measurement of the deviation of the original position of the second rotational position sensor in this order.

3. The electric vehicle according to claim 2, wherein
the measurement controller is configured to
   change a torque ratio between the first drive wheel and the second drive wheel to 1:0 or 0:1,
   execute the measurement of the deviation of the original position of the first rotational position sensor or the second rotational position sensor that corresponds to either one of the first traveling motor and the second traveling motor whose torque is set to 0,
   invert the torque ratio between the first drive wheel and the second drive wheel, and
   execute the measurement of the deviation of the original position of the other of the first rotational position sensor and the second rotational position sensor that corresponds to the other of the first traveling motor and the second traveling motor.

4. The electric vehicle according to claim 3, further comprising
a traveling controller configured to
accelerate the electric vehicle on a basis of an operation of a pedal of the electric vehicle in a forward direction, and
perform braking of the electric vehicle on a basis of an operation of the pedal of the electric vehicle in a backward direction.

5. The electric vehicle according to claim 2, further comprising
a traveling controller configured to
accelerate the electric vehicle on a basis of an operation of a pedal of the electric vehicle in a forward direction, and
perform braking of the electric vehicle on a basis of an operation of the pedal of the electric vehicle in a backward direction.

6. The electric vehicle according to claim 2, wherein
in a case where a vehicle speed of the electric vehicle is within the second wheel-speed range and increasing, the measurement controller switches the execution order to execute the measurement of the deviation of the original position of the second rotational position sensor and the measurement of the deviation of the original position of the first rotational position sensor in this order.

7. The electric vehicle according to claim 1, wherein
the second wheel-speed range is lower than the first wheel-speed range, and
in a case where a vehicle speed of the electric vehicle is within the second wheel-speed range and increasing, the measurement controller switches the execution order to execute the measurement of the deviation of the original position of the second rotational position sensor and the measurement of the deviation of the original position of the first rotational position sensor in this order.

8. The electric vehicle according to claim 7, wherein
the measurement controller is configured to
change a torque ratio between the first drive wheel and the second drive wheel to 1:0 or 0:1,
execute the measurement of the deviation of the original position of the first rotational position sensor or the second rotational position sensor that corresponds to either one of the first traveling motor and the second traveling motor whose torque is set to 0,
invert the torque ratio between the first drive wheel and the second drive wheel, and
execute the measurement of the deviation of the original position of the other of the first rotational position sensor and the second rotational position sensor that corresponds to the other of the first traveling motor and the second traveling motor.

9. The electric vehicle according to claim 8, further comprising
a traveling controller configured to
accelerate the electric vehicle on a basis of an operation of a pedal of the electric vehicle in a forward direction, and
perform braking of the electric vehicle on a basis of an operation of the pedal of the electric vehicle in a backward direction.

10. The electric vehicle according to claim 7, further comprising
a traveling controller configured to
accelerate the electric vehicle on a basis of an operation of a pedal of the electric vehicle in a forward direction, and
perform braking of the electric vehicle on a basis of an operation of the pedal of the electric vehicle in a backward direction.

11. The electric vehicle according to claim 1, wherein
the measurement controller is configured to
change a torque ratio between the first drive wheel and the second drive wheel to 1:0 or 0:1,
execute the measurement of the deviation of the original position of the first rotational position sensor or the second rotational position sensor that corresponds to either one of the first traveling motor and the second traveling motor whose torque is set to 0,
invert the torque ratio between the first drive wheel and the second drive wheel, and
execute the measurement of the deviation of the original position of the other of the first rotational position sensor and the second rotational position sensor that corresponds to the other of the first traveling motor and the second traveling motor.

12. The electric vehicle according to claim 11, further comprising
a traveling controller configured to
accelerate the electric vehicle on a basis of an operation of a pedal of the electric vehicle in a forward direction, and
perform braking of the electric vehicle on a basis of an operation of the pedal of the electric vehicle in a backward direction.

13. The electric vehicle according to claim 1, further comprising
a traveling controller configured to
accelerate the electric vehicle on a basis of an operation of a pedal of the electric vehicle in a forward direction, and
perform braking of the electric vehicle on a basis of an operation of the pedal of the electric vehicle in a backward direction.

14. An electric vehicle comprising:
a first traveling motor configured to generate driving power to drive a first drive wheel;
a second traveling motor configured to generate driving power to drive a second drive wheel;
a first rotational position sensor configured to detect a rotation angle of the first traveling motor, the first rotational position sensor having a first Wheel-speed range in which a deviation of an original position of the first rotational position sensor is measurable;
a second rotational position sensor configured to detect a rotation angle of the second traveling motor, the second rotational position sensor having a second wheel-speed range in which a deviation of an original position of the second rotational position sensor is measurable, the second wheel-speed range being different from the first wheel-speed range; and
circuitry configured to
execute, in a sequential execution order, measurement of the deviation of the original position of the first rotational position sensor and measurement of the deviation of the original position of the second rotational position sensor while the electric vehicle is traveling, and switch a sequence of the sequential execution order between the measurement of the deviation of the original position of the first rotational position sensor and the measurement of the deviation of the original position of the second rotational position sensor on a basis of traveling data on acceleration or deceleration of the electric vehicle.

15. The electric vehicle according to claim 14, wherein
the second wheel-speed range is lower than the first wheel-speed range, and
in a case where a vehicle speed of the electric vehicle is within the first wheel-speed range and decreasing, the circuitry switches the execution order to execute the measurement of the deviation of the original position of the first rotational position sensor and the measurement of the deviation of the original position of the second rotational position sensor in this order.

16. The electric vehicle according to claim 14, wherein
the second wheel-speed range is lower than the first Wheel-speed range, and
in a case where a vehicle speed of the electric vehicle is within the second wheel-speed range and increasing, the circuitry switches the execution order to execute the measurement of the deviation of the original position of the second rotational position sensor and the measurement of the deviation of the original position of the first rotational position sensor in this order.

17. The electric vehicle according to claim 14, wherein the circuitry is configured to
change a torque ratio between the first drive wheel and the second drive wheel to 1:0 or 0:1,
execute the measurement of the deviation of the original position of the first rotational position sensor or the second rotational position sensor that corresponds to either one of the first traveling motor and the second traveling motor whose torque is set to 0,
invert the torque ratio between the first drive wheel and the second drive wheel, and
execute the measurement of the deviation of the original position of the other of the first rotational position sensor and the second rotational position sensor that corresponds to the other of the first traveling motor and the second traveling motor.

18. The electric vehicle according to claim 14, further comprising
a traveling circuitry configured to
accelerate the electric vehicle on a basis of an operation of a pedal of the electric vehicle in a forward direction, and
perform braking of the electric vehicle on a basis of an operation of the pedal of flee electric vehicle in a backward direction.

19. A non-transitory computer readable medium storing instructions for an electric vehicle, the instructions executable on a processor, the instructions comprising:
executing, in a sequential execution order, measurement of a deviation of an original position of a first rotational position sensor and measurement of the deviation of an original position of a second rotational position sensor while the electric vehicle is traveling; and
switching the sequential execution order between the measurement of the deviation of the original position of the first rotational position sensor and the measurement of the deviation of the original position of the second rotational position sensor on a basis of traveling data on acceleration or deceleration of the electric vehicle,
wherein the electric vehicle includes:
a first traveling motor configured to generate driving power to drive a first drive wheel,
a second traveling motor configured to generate driving power to drive a second drive wheel,
the first rotational position sensor configured to detect a rotation angle of the first traveling motor, the first rotational position sensor having a first wheel-speed range in which a deviation of the original position of the first rotational position sensor is measurable, and
a second rotational position sensor configured to detect the rotation angle of the second traveling motor, the second rotational position sensor having a second wheel-speed range in which the deviation of the original position of the second rotational position sensor is measurable, the second wheel-speed range being different from the first wheel-speed range.

20. The non-transitory computer readable medium according to claim 19, the instructions further comprising:
setting the second wheel-speed range is lower than the first wheel-speed range;
in a case where a vehicle speed of the electric vehicle is within the first wheel-speed range and decreasing, switching the execution order to execute the measurement of the deviation of the original position of the first rotational position sensor and the measurement of the deviation of the original position of the second rotational position sensor in this order; and
in a case where a vehicle speed of the electric vehicle is within the second wheel-speed range and increasing, switching the execution order to execute the measurement of the deviation of the original position of the second rotational position sensor and the measurement of the deviation of the original position of the first rotational position sensor in this order.

* * * * *